US008812495B1

(12) United States Patent
Pragada et al.

(10) Patent No.: US 8,812,495 B1
(45) Date of Patent: Aug. 19, 2014

(54) UNIVERSAL RANKING MECHANISM:METHOD AND APPARATUS FOR RANKING SEARCH RESULTS WITH OR WITHOUT KNOWLEDGE BASE FOR STRUCTURED OR UNSTRUCTURED CONTENT

(75) Inventors: Sreenivasa Rao Pragada, Irvington, NY (US); Raju Venkata Rama Raju Gopala Gottumukkala, Cumming, GA (US); Abhijit Ashok Patil, Alphretta, GA (US); Kaliki Murthy Aritakula, Cumming, GA (US); Viswanath Dasari, Alpharetta, GA (US)

(73) Assignee: Semantifi, Inc., Stamford, CT (US)

( * ) Notice: Subject to any disclaimer, the term of this patent is extended or adjusted under 35 U.S.C. 154(b) by 0 days.

(21) Appl. No.: 13/210,402

(22) Filed: Aug. 16, 2011

Related U.S. Application Data (60) Provisional application No. 61/374,596, filed on Aug. 17, 2010.

(51) Int. Cl.
*G06F 17/30* (2006.01)
(52) U.S. Cl.
USPC .......................................... 707/723; 707/779
(58) Field of Classification Search
USPC ......................... 707/713, 723, 779
See application file for complete search history.

(56) References Cited

U.S. PATENT DOCUMENTS

| 6,363,373 | B1 * | 3/2002 | Steinkraus | 1/1 |
| 2004/0122656 | A1 * | 6/2004 | Abir | 704/4 |
| 2011/0055188 | A1 * | 3/2011 | Gras | 707/706 |

OTHER PUBLICATIONS

Tomassen et al.; "Measuring intrinsic quality of semantic search based on feature vectors"; 2010; Int. J. Metadata, Semantics and Ontologies, vol. 5, No. 2; 17 pages.*

* cited by examiner

*Primary Examiner* — Monica Pyo
(74) *Attorney, Agent, or Firm* — Gordon Kessler (57) ABSTRACT

A method and system for determining a degree of match between content and a search query are provided. The method includes the steps of determining a quality of recognition of a search query in accordance with a knowledge base, determining a quality of recognition of search content in accordance with a knowledge base, determining a quality of match between one or more knowledge base representations of the search query and one or more knowledge base representations of the search content, and computing a composite measure of the degree of match between search query and search content in accordance with the quality of recognition of the search query, quality of recognition of the search content, and the quality of match.

25 Claims, 4 Drawing Sheets

UNIVERSAL RANKING MECHANISM: METHOD AND APPARATUS FOR RANKING SEARCH RESULTS WITH OR WITHOUT KNOWLEDGE BASE FOR STRUCTURED OR UNSTRUCTURED CONTENT

CROSS REFERENCE TO RELATED APPLICATIONS

This application claims the benefit of U.S. Provisional Patent Application Ser. No. 61/374,596, titled "Universal Ranking Mechanism: Method for Ranking Search Results with or without knowledge base for structured or unstructured content" on Aug. 17, 2010 by Pragada et al., the entire contents thereof being incorporated herein by reference.

FIELD OF THE INVENTION

Embodiments of this invention relate generally to ranking of search results and more particularly to a method and apparatus for ranking search results with or without knowledge base for structured or unstructured content.

BACKGROUND OF THE INVENTION

Search involves three key tasks. First, the task of recognizing for what one is searching (subject). Second, the task of recognizing content that may match the subject (content). And, third, the task of matching our understanding of the subject and content (match).

As an illustration, consider what takes place when one is searching their home for their favorite purple pen. One may say that they simply look around the house for the favorite pen but essentially, the searcher is doing three things: (1) recognizing or recollecting what the favorite pen looks like and (2) walk around and look or recognize the contents of the house and finally, (3) compare them for a match. People, search so naturally that they typically do not pay attention to these fundamental tasks of search.

When one performs a search, and perhaps either finds no result or finds a number of results, it currently is difficult to determine whether the search has been performed correctly and completely, i.e. it is difficult to determine the quality of the search that has taken place. Therefore, it would be desirable to provide a method and apparatus that allows for the determination of the quality of a search.

SUMMARY OF THE INVENTION

In accordance with various embodiments of the invention, a method and apparatus are provided for determining the quality of a search and therefore search results. Accordingly, the inventors of the present invention have determined that Quality of Search is a composite of three tasks. Therefore, one can say that Quality of Search=Composite (Qualities of Recognizing Subject, Quality of Recognizing Content, Quality of Matching Subject and Content). A perfect search is possible when all the three tasks are perfect. A total failure is likely when any one of the three tasks has failed completely. Various embodiments of the invention describe one or more methods for determining each of the three quality measures, and therefore an overall quality of search.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
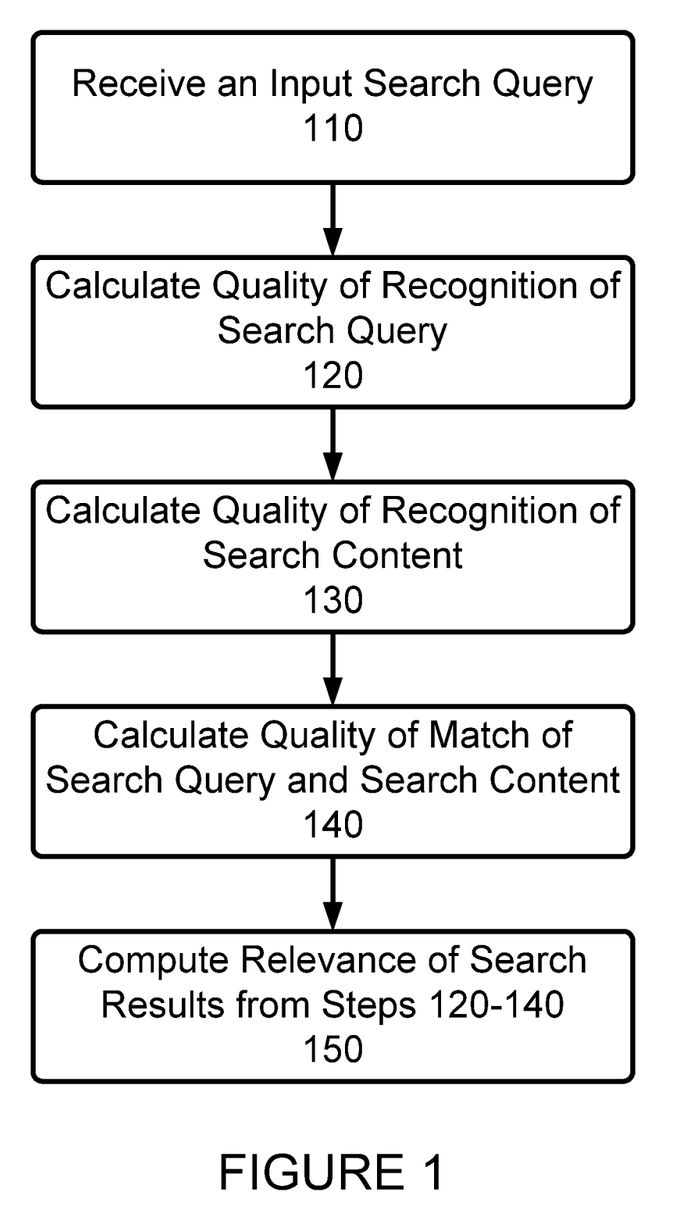
FIG. 1 is a flowchart diagram depicting the steps for determining a semantic ranking in accordance with an embodiment of the invention.

Various embodiments of the present invention will now be described, making reference to the figures. In accordance with one or more embodiments of the present invention, a quality measurement of search may be applied to a semantic search. When applying these concepts of quality to Semantic Search, Quality of Search may also be called Relevance of Search Results. Determining such quality of search includes four main steps. As is shown in FIG. 1, after receiving an input search query at step 110, at step 120, a quality of the recognition of a search query is computed, and at step 130 a quality of recognition of the search content is computed. Next, at step 140 a quality of matching of the search query and the search content is computed. Finally, at step 150, as a combination of the calculated values from steps 120, 130 and 140 a relevance measure of the search results is computed.

Figure 2:
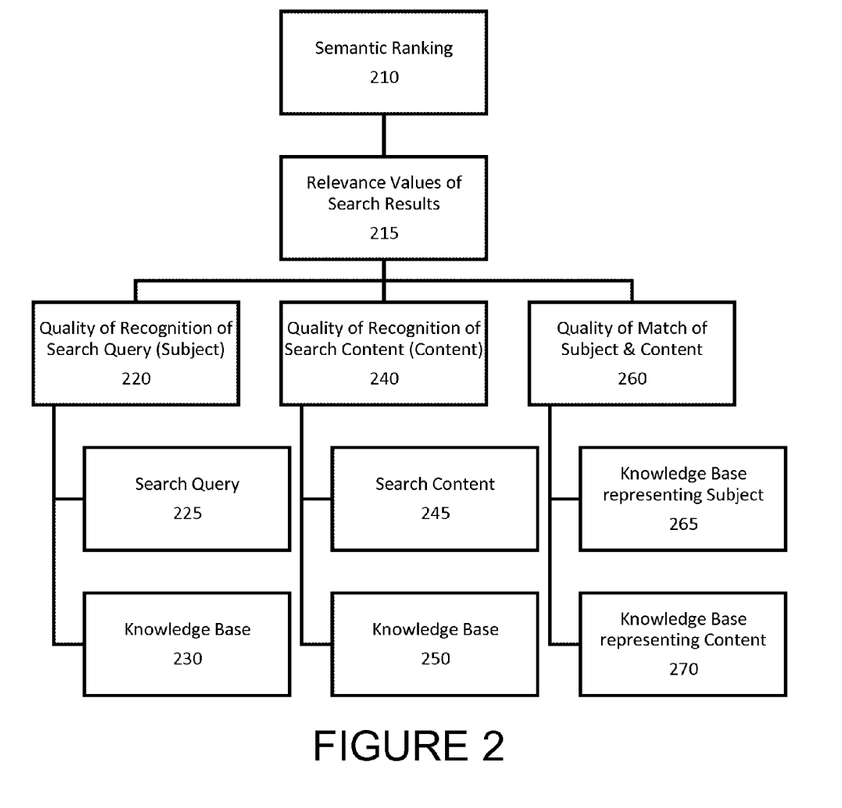
FIG. 2 is an organization diagram indicating information that may be included in determining a semantic ranking in accordance with an embodiment of the invention.

FIG. 2 depicts an organizational diagram that shows an ultimate semantic ranking 210 being based upon relevance values of search results 215. These relevance values are in turn based upon the quality of recognition of search query 220, the quality of recognition of search content 240, and the quality of matching subject and content 260, as noted above. Further, quality of recognition of search query 220 and content 240 are based upon the search query 225, 230 and the knowledge base 245, 250, respectively, whereas the quality of matching the subject and the content is based upon the knowledge base representing the subject 265 and the knowledge base representing the content 270.

Each of the computation steps will now be described in greater detail.

Computing Quality of Recognition of Search Query

From a mathematical perspective, Quality of Recognition of Search Query is dependent on how well search query tokens comprising a search query are recognized and connected with respect to a knowledge base. It is assumed that a search engine is available to recognize a search query using knowledge base. An example of such a search engine is disclosed in U.S. patent application Ser. No. 11/929,734, "System and Method for Converting a Natural Language Query into a Logical Query", filed Oct. 30, 2007, currently pending, the entire contents thereof being incorporated herein by reference. Of course, other search engines may also be employed.

In accordance with various embodiments of the invention, a knowledge base comprises bits and pieces of information (i.e. knowledge entities) that may or may not be connected. A knowledge base may be made up of knowledge models and knowledge index. Knowledge models are essentially collections of knowledge entities, sometimes connected, comprising a graph. A knowledge index is a collection of many indices such as synonyms, abbreviations, acronyms, formulae, conversion rules, linguistic roots, etc. providing extra information and metadata for one or more of the knowledge entities comprising a knowledge model. Knowledge indices help in recognizing many variations of knowledge entities, and thus provide a way for expanding a knowledge entity to encompass other entities that may be equivalent or related to a particular knowledge entity. For instance, a query "Shops within 100 yards" can be recognized as the same as "Shops within 300 feet" based on the knowledge index of conversion rules and the specific rule which explains that "1 Yard=3 Feet". The job of a search engine in accordance with embodiments of the present invention is therefore to understand a user or other query using knowledge base, rather than a more traditional key word search technique, thus allowing logical connections to be employed. To best understand a search query, all tokens should be recognized as knowledge model entities, and should be connected if connections exist among them.

To allow a search engine to best understand a presented search query, each query term is first considered to be a search token. When considering the search query, each search token may be compared to and recognized as one or more knowledge model entities, or as related thereto. Once recognized as knowledge model entities, or related thereto, a determination of whether the recognized knowledge model entities are connected in accordance with the knowledgebase, and in what manner these connections are manifested. Therefore, in accordance with various embodiments of the present invention, search query tokens may be either directly "matched" to knowledge entities or indirectly "resolved" as potential knowledge model entities via one or more knowledge indices. Direct matches between a particular search query and one or more knowledge model entities offer perfect recognition of search query tokens whereas resolving of such entities through the use of one or more indices results in less than perfect recognition of that search token. Resolving search tokens through multiple knowledge indices lowers the strength of recognition of entities. This is because with each resolving transaction involved in any such recognition results in an ever greater number of entities that are not precise synonyms being employed, thus injecting uncertainty into any later potential matches. Thus, direct matches essentially produce an identity, thus incurring no degradation in accuracy, while indirect resolution may introduce less than perfect accuracy as uncertainty is included with each such indirect resolution.

For such indirect resolutions, a decrement in the quality of recognition of the search query with each resolution is dependent on the specific index employed, and whether the outcomes from that index are deterministic or not. For instance, an outcome from an index of conversion rules is deterministic (in that such conversions necessarily include a 100% confidence and therefore there is no ambiguity in the resolution) and therefore no decrement in the quality of recognition of the search query is necessary. However, for example, in an index that does not provide 100% confidence in a relationship, many outcomes may be possible, for example for any given abbreviation from an index of abbreviations and therefore a decrement in a score related to quality of recognition of a search query is necessary in that one may not be 100% sure that a particular abbreviation refers to a particular potentially corresponding non-abbreviation. The amount of any such decrement may be subjective as long as some decrement is considered. The amount of the subjective decrement is preferably related to the uncertainty of the relationship between knowledge model entity and the search query token, or in this example, the abbreviation and the non-abbreviation, inherently influenced by the number of other possible non-abbreviations that may be related.

Next, a level of interconnection between various knowledge model entities corresponding to the various search query tokens, corresponding in turn to the various terms in the search query also has an effect on the quality of the recognition of the search query. In particular, the more knowledge model entities corresponding to the search query tokens that are connected, the higher the quality of recognition of the search query. This is because as interconnections in a knowledge model index corresponding to elements of a search query increase, it is more likely that the entities are related, and that the search query has been properly recognized. Alternately, it can be said the knowledge entities related to terms in a search query that are not highly connected with other entities in the search query can penalize the quality of recognition of the search query. As noted above, each knowledge entity is part of a knowledge model graph (connected or disconnected). This grouping of knowledge entities in a graph gives additional information about that entity itself. For example, if we consider entity named "Mustang", a most common recognition of this name is as a Car. However, in reality, a Mustang is a type of Horse, Aircraft, Motorcycle as well as name of a city and many other things that may or may not exist in the knowledge base. Thus in order to say with certainty that it is a car, it is necessary to determine how sure one is about the Automobile domain. Certainty about the domain is achieved by having more and more recognitions from that domain. Thus having more recognitions from the domain of the knowledge entity, either connected or unconnected gives more certainty to Mustang/Car recognition. Stating the converse, if no other recognition is present from the knowledge model, the certainty and hence relevance of the recognition of knowledge entity is less.

As described in the '734 application noted above, the output of Search Query Recognition is a graph of entities that may be connected depending on the knowledge base with which the search query is recognized. A "forest of trees" with some fully connected tress, some partial and branches and some leaves is a potential analogy of this output graph also called Reduced Form.

Rules for determining a quality of recognition of entities within a search query are as follows:
  a. Quality of recognition of entities cannot be more than perfect
  b. The highest expectation is to have a "perfect" recognition i.e. "all" tokens be recognized and connected
  c. Direct matches of search query tokens to knowledge base entities results in perfect entity recognition, thus avoiding any decrement in the confidence or quality of search.
  d. Search query tokens that are indirectly resolved as knowledge entities via one or more knowledge indices may result in less than perfect quality of entity recognition. Therefore, quality of recognition of indirectly resolved entities may be decremented in the manner as noted above.

Figure 3:
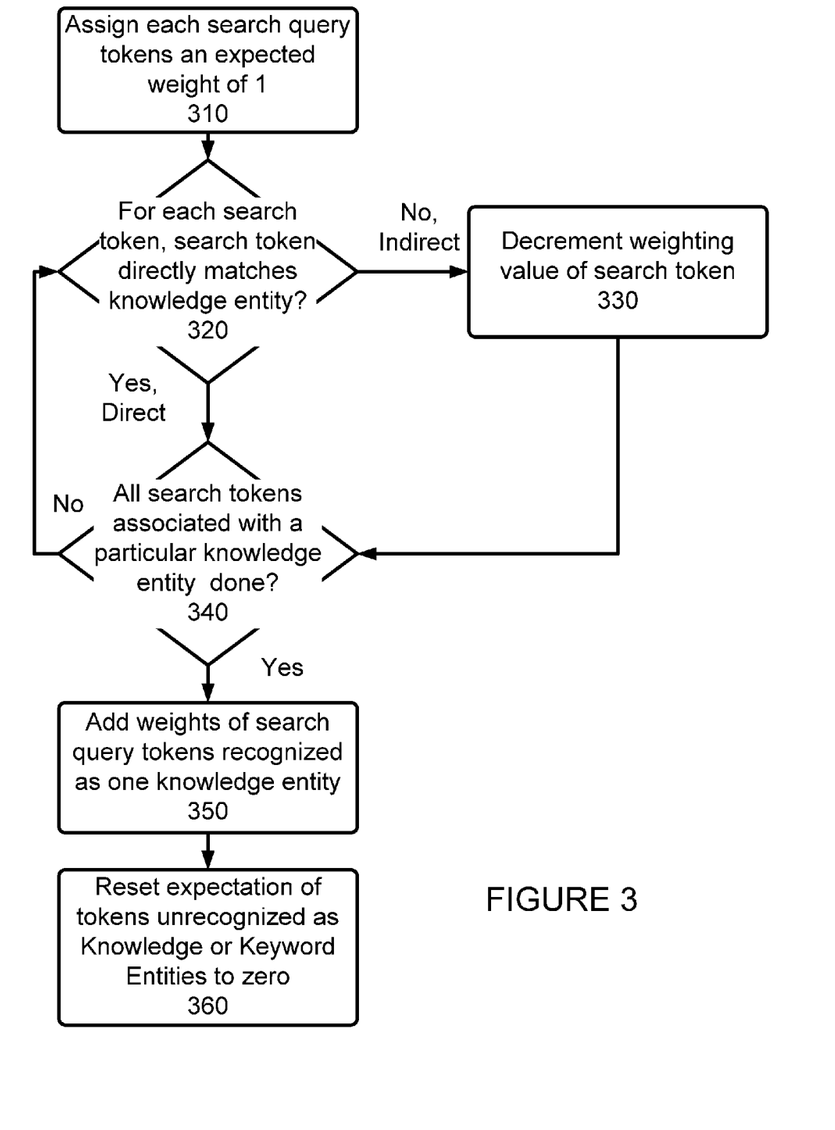
FIG. 3 is a flowchart diagram depicting computing a quality of recognition of knowledge entities within a search query.

A method for computing a quality of recognition of knowledge entities within a search query is shown in FIG. 3, and may be described as follows. At step 310, assign all search query tokens an expected weight of 1, thus starting at the expectation of direct, perfect resolution between the search query token and one or more knowledge model entities. Therefore, the weight of a recognized token can be at most 1, assuming no decrement during resolution. At step 320, query whether each search query token directly matches a knowledge entity. Do nothing (i.e. do not decrement the current score of the search query token from 1) for search query tokens that directly match knowledge entities, and processing passes to step 340. Alternatively, the value associated with each search token may be decremented for knowledge entities that are indirectly resolved at step 330, in a manner as described above. Query at step 340 whether all search query tokens associated with a particular search query have been processed. At step 350, add weights of multiple search query tokens that comprise a single knowledge entity. At step 360, any unrecognized search query tokens (i.e. tokens that cannot be resolved to any knowledge model entity, either directly or indirectly, through any number of indices) to zero so that any such unrecognized content does not increase relevance values of the search query in general. Finally, one may optionally compute weights of all knowledge entities to get an overall quality of recognition of knowledge entities in accordance with the search query (not shown).

In accordance with this preferred set of steps in accordance with an embodiment of the invention, a score for quality of recognition of entities within a search query may be calculated. In addition to computing such a score for recognition of entities, a score for quality of connections or associations of knowledge entities may also preferably be calculated. Therefore, in accordance with one or more embodiments of the present invention, for each knowledge entity, the more connections it has with other knowledge entities in the knowledge model graph, the more likely it is to be properly recognized. Thus, a lack of such connections is a reason to further decrement the recognition value calculated above for each knowledge entity. (If no such connections exist, then this set of steps may be skipped.) Such a process will now be described making reference to FIG. 4. As noted above with respect to the quality of recognition of entities described above in FIG. 3, first at step 410, each knowledge entity carries over its value from the result in FIG. 3. Then at step 420 it is determined whether a particular knowledge model entity derived from a first element of the search query is connected with another knowledge model entity derived from a next element of the search query through either a direct connection or an indirect connection. If it is determined that the particular search query is not directly connected to or associated with another knowledge entity, then processing passes to step 430, and there is a decrement to the weight of that particular knowledge entity in order to penalize the quality of the recognition of the search query. After such decrementing, processing passes to step 440, as will be described below. If it is determined at step 420 that the particular knowledge entity is directly connected to or associated with another knowledge entity, then there is no decrement to the weight of the knowledge entity. Processing then passes to step 440.

Figure 4:
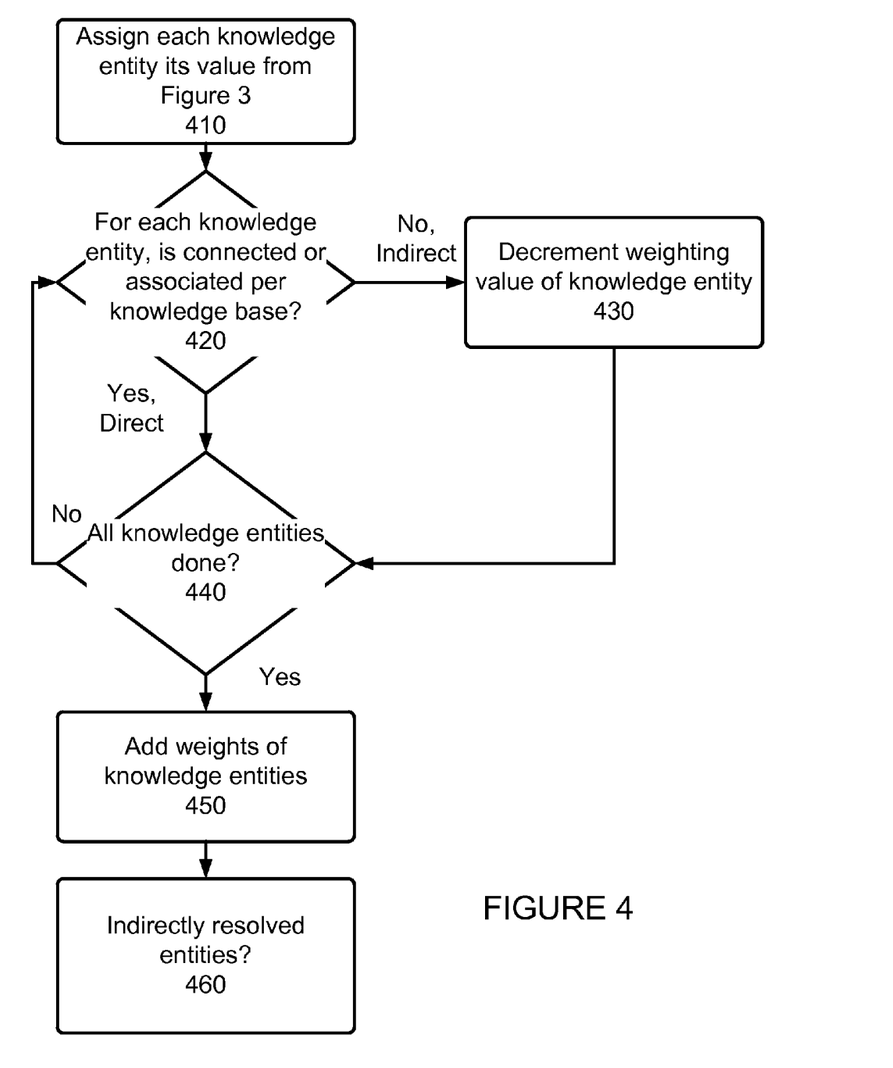
FIG. 4 is a flowchart diagram depicting computing a quality of association of knowledge entities within a search query.

At step 440, it is determined whether all knowledge entities associated with a particular search query have been processed. If it is determined that all knowledge entities have not been processed, then processing returns to step 420, and a next knowledge entity is processed. If it is determined that all knowledge entities associated with a particular search query have been processed, then processing proceeds to step 450 where the weights of the knowledge entities are combined, using addition, a weighted average, or some other predefined combination.

Knowledge base may contain multiple associations between two entities. Some associations may be direct associations i.e. direct relation between entities. Some other associations may be resolved through other entities in between i.e. indirectly connected. These determinations for each pair of entities has been determined above. As noted above, compared to direct associations, indirect associations are weaker therefore penalize the final overall score for the quality of the recognition of the search query. However, after considering each of these pairs, a graph of each relationship may be determined. If after such determination one or more knowledge entities is connected to other knowledge entities only by indirectly resolved entities, then at step 460, the overall score for the recognition of search query is again penalized, and a final score results.

In order to provide an overall score for quality of the recognition of the overall search query, one may compute total weight, comprising the sum or other function of the determined weights associated with each search query token (B), compute total weight of the knowledge entities (i.e. the computed value if there had been no decrements on the search query token weights) (A), and then compute the quality of recognition of the overall search query as the ratio of A over B.

Computing Quality of Recognition of Search Content

A process employed for recognizing or understanding content is similar to the process noted above with respect to recognizing the search query. Instead of a short sentence or two acting as a query, content may be many paragraphs or pages long. Thus, the algorithms described referring to FIGS. 3 and 4 would be applicable to recognize entities and connections of search content as well. As described in the '734 application noted above, the output of such recognizing search content is provided as a reduced form.

Quality of Match of Search Query & Search Content

Computing the quality of the match of the search query and the search content comprises comparing two or more graphs, a first representative of a relationship of the search query terms to each other, and a second representative of a relationship of terms in the search content to each other. While comparing graphs is an obvious technique, making such a comparison in accordance with the present invention relies at least in part on two important concepts. First, it is important to consider the hierarchical nature of knowledge when comparing such graphs when computing the quality of match between entities. Second, it is important to note that an exact match of an entity to entity results in a perfect match, similar to a direct match described above, whereas resolution of one or more instances of a knowledge entity, while also a relevant match to the knowledge entity, is not a perfect match, but rather an indirect match, similar to that noted above. Therefore, the existence of any such indirect matches should result in a decrement of a quality measure when computing quality of match.

In accordance with one or more embodiments of the present invention, searching for user requested information in a content knowledgebase may be performed in accordance with an inventive indexing and querying mechanism described in U.S. Provisional Patent Application Ser. No. 61/374,595, filed Aug. 17, 2010 titled "Method and Apparatus for Storing Ontologies in a Relational Database, the entire contents thereof being incorporated herein by reference, and U.S. patent application Ser. No. 13/210,409, filed Aug. 16, 2011, titled "Method And Apparatus For Indexing And Querying Knowledge Models", the entire contents thereof being incorporated herein by reference. In accordance with one or more embodiments of the present invention, a match weight calculation is preferably performed in order to provide an overall quality of matching index between a search query and available content. A knowledge graph is preferably formed as a collection of triples and sometimes individual knowledge entities. These triples may be all at an instance level, a concept level, or combination thereof. As an example, when a triple such as "Clint Eastwood directs movies" is considered, less precise information from it could be represented by one of its variation as "Person directs Movies". Even though this is valid information, it is less precise compared to actual content and hence has less weight. When such information is matched from user query the match weight is lower. Same thing can be said about the partial information also. Matching only Clint Eastwood from the whole triple gives less precise information and hence less weighing match. Variations have a quality (weight) associated with them, which takes care of this match factor.

3 rules for ranking matches are provided in accordance with an embodiment of the invention.
1. An exact match is the best
2. More is Less
3. Less is lesser This means first preference is given to perfect matches, second is matches that give additional information than asked and then the less then asked information. When a knowledge graph for content or user query is stored, it also stores the number of entities and triples in that knowledge graph. This information is used to implement rules stated above. A particular example for determining a number of entities and triples in a knowledge graph will now be described.

A number of entities and triples from content may be represented by a CONTENT-ENTITY-COUNT and a CONTENT-TRIPLE-COUNT. For example, a Knowledge Graph may be represented as follows in Table 1:

TABLE 1

| Million-Dollar-Baby | Directed-by | Clint-Eastwood |
|---|---|---|
|  | Produced-by | Clint-Eastwood |

This knowledge graph contains 2 triples (Million Dollar Baby—Directed By—Clint Eastwood; and Million Dollar Baby—Produced By—Clint Eastwood) and 4 distinct entities (Million Dollar Baby, Directed By, Produced By, and Clint Eastwood), so that the CONTENT-ENTITY-COUNT=4 and the CONTENT-TRIPLE-COUNT=2

Similarly, for a user query one can calculate UQ-ENTITY-COUNT and UQ-TRIPLE-COUNT. For example, if user query is asked, such as "who directed Million Dollar Baby" then its knowledge-graph may be shown in Table 2

TABLE 2

| Million Dollar Baby | Directed-by | ?(Director) |
|---|---|---|

This results in a UQ-ENTITY-COUNT=3 (Million Dollar Baby, Directed-by, and ?(Director), and a UQ-TRIPLE-COUNT=1.

When a user query knowledge graph is matched with content knowledge graph, the number of entities and triples matched may also be found, called MATCHED-ENTITY-COUNT and MATCHED-TRIPLE-COUNT. In above case considering the example knowledge graph and the example query knowledge graph, "Million Dollar baby, Directed-by and Director (in concept)" match, the MATCHED-ENTITY-COUNT=3 (Concepts of all three entities match) and the MATCHED-TRIPLE-COUNT=1 (Concepts of the triple match).

A more complete example of such processing in use will now be described. Following up on the above example from entertainment domain. In accordance with embodiments of the invention, the following (numbered) content pages may be provided.
1. Million Dollar Baby is a 2004 American sports drama film directed, produced, and scored by Clint Eastwood and starring Eastwood, Hilary Swank, and Morgan Freeman (from Wikipedia)
2. Million Dollar Baby—Movie Info (from Rotten Tomatoes)
   PG-13, 2 hr. 12 min.
   Drama, Romance
   Directed By: Clint Eastwood
   Written By: Paul Haggis
3. Clint Eastwood not only directed and produced an Oscar nominated movie in 2004 but also played Frankie Dunn, an old-school boxing trainer afraid of intimacy after a painful rift with his daughter. (from Yahoo Movies)
4. Clint Eastwood directed and produced many movies. (from some blog)

For the sake of this example, consider that the knowledge base contains only movies, their directors and actors and doesn't know about characters in movie. So each (numbered) content document will result in the associated reduced forms as shown on Tables 3-6 below.

TABLE 3

| 1. Million-Dollar-Baby | Directed-by | Clint-Eastwood |
|---|---|---|
|  | Produced-by | Clint-Eastwood |
|  | Background-Score-by | Clint-Eastwood |
|  | Stars | Clint-Eastwood |
|  | Stars | Hillary-Swank |
|  | Stars | Morgan-Freeman |
|  | Released-in | Year-2004 |

Therefore, this first content includes a CONTENT-ENTITY-COUNT=10 (only distinct entities) and a CONTENT-TRIPLE-COUNT=7

TABLE 4

| 2. Million-Dollar-Baby | Directed-by | Clint-Eastwood |
|---|---|---|
|  | Written-by | Paul-Higgins |

Therefore, this second content includes a CONTENT-ENTITY-COUNT=4 (only distinct entities) and a CONTENT-TRIPLE-COUNT=2

TABLE 5

| 3. Million-Dollar-Baby | Directed-by | Clint-Eastwood |
|---|---|---|
|  | Produced-by | Clint-Eastwood |
|  | Released-in | Year-2004 |

Therefore, this third content includes a CONTENT-ENTITY-COUNT=7 (only distinct entities) and a CONTENT-TRIPLE-COUNT=5

TABLE 6

| 4. Million-Dollar-Baby | Directed-by | Clint-Eastwood |
|---|---|---|
|  | Produced-by | Clint-Eastwood |

Therefore, this fourth content includes a CONTENT-ENTITY-COUNT=4 (only distinct entities) and a CONTENT-TRIPLE-COUNT=2

Now, given this content, consider a user is looking for content that talks about "Movies directed and produced by Clint Eastwood." The user query knowledge graph (reduced form) may be represented as follows in Table 7.

TABLE 7

| Movie | Directed-by | Clint-Eastwood |
|---|---|---|
| | Produced-by | Clint-Eastwood |

This user query therefore comprises a UQ-ENTITY-COUNT=4 and a UQ-TRIPLE-COUNT=2

Once the various reduced forms (knowledge graphs) for each content entity and each query are determined, a match algorithm in accordance with one or more embodiments of the present invention tries to match this user query knowledge graph with content knowledge graphs presented above. The match results between the query and each (numbered) content entity may be determined as follows:

Once these various counts have been determined, a number of rules can be used to then determine a quality of match between the query and the various content documents, and in turn rank the various content documents in their ability to respond to the user query. Such scoring for implementing such a ranking system may be determined in accordance with Table 8. It should be noted that for each situation in which the ratio is determined to be less than 1, the amount of decrement is determined in accordance with the deviation of the ration from 1.

TABLE 8

An exact match is the best match, so not decrement in quality of match. A exact match is represented by the following

| | |
|---|---|
| 1.1. | (Matched-Entity-Count/UQ-Entity-Count) = 1 |
| 1.2. | (Matched-Triple-Count/UQ-Triple-Count) = 1 |
| 1.3. | (Matched-Entity-Count/Content-Entity-Count) = 1 |
| 1.4. | (Matched-Triple-Count/Content-Triple-Count) = 1 |
| 2 | If there are more entities or triples in the content than match those in the query, but the content includes a match for each query entity and triple, decrement the quality of match a little. Such a situation is represented by the following |
| 2.1. | (Matched-Entity-Count/UQ-Entity-Count) = 1 |
| 2.2. | (Matched-Triple-Count/UQ-Triple-Count) = 1 |
| 2.3. | (Matched-Entity-Count/Content-Entity-Count) < 1 |
| 2.4. | (Matched-Triple-Count/Content-Triple-Count) < .1 |
| 3 | If there are more entities or triples in the query than the content, the content cannot provide all of the information. Decrement the quality of match a lot. Such a situation is represented by the following |
| 3.1. | (Matched-Entity-Count/UQ-Entity-Count) < 1 |
| 3.2. | (Matched-Triple-Count/UQ-Triple-Count) < 1 |
| 3.3. | (Matched-Entity-Count/Content-Entity-Count) = 1 |
| 3.4. | (Matched-Triple-Count/Content-Triple-Count) = 1 |

For content entity 1, as question triples are of type CRI i.e. Concept-Relation-Instance triples, they may be matched with similar portions of the content graph. In this particular instance, one of the variations from the content graph (e.g. Million-Dollar-Baby (Movie)—directed-by—Clint-Eastwood) matches with the query (Movie—directed-by—Clint-Eastwood.) Similarly, a second of the variations from the content graph (e.g. Million-Dollar-Baby (Movie)—produced-by—Clint-Eastwood) matches with the query (Movie—produced-by—Clint-Eastwood.) Thus, in this particular instance, both required query triples are matched with variations in the content knowledge graph MATCHED-TRIPLE-COUNT=2 and MATCHED-TRIPLE-ENTITY=4 with a reduction in actual match weight as one or more of the matches include some variation, and there is substantial additional information in this content as compared to the requested query.

2. For content entity 2, only the "directed by" content is found to match (in the manner as described above). Because the content entity does not include the "produced by" information, there can be no such match to that portion of the user query. Thus, the MATCHED-TRIPLE-COUNT=1 and MATCHED-TRIPLE-ENTITY=3 with a reduction in actual match weight as one or more of the matches include some variation.

3. For content entity 3, similar to content entity 1, there is an exact match with MATHED-TRIPLE-COUNT=2 and MATCHED-TRIPLE-ENTITY=4. This content also includes has some information in addition to what the user asked for.

4. For content entity 4, there is a perfect match, as the exact same information is in the entity as is asked for in the query, with no additional information present: Thus, again, MATHED-TRIPLE-COUNT=2 and MATCHED-TRIPLE-ENTITY=4, with no additional information Based upon application of the above rules, content is ordered 4,3,1,2 in their ability to accurately answer the user query. Content page 4 comes first because there is a 100% match, and therefore there has been no decrement in quality at all. Page 3 comes next even though it is 100% match because there is additional information on this content page that is not relevant to answering the user query. Page 1 comes next as the information is once again matched, but again it is more than what user is looking for, and the match is through variations of the content data. Finally, Page 2 comes last as it does not have all the information to respond to the user query Alternatively, for example, if the query would be "has Clint Eastwood played a character called Frankie Dunn", the second content page would be provided as the nest content page for answering the user query. In this case, page 2 is the only content page (knowledge graph representation that can recognize not only Clint Eastwood (we do not have knowledge of characters played by actors), which is present in all the content sources, but also recognize the keyword "Frankie Dunn." The extra weight of such a recognition will place it at the top of the list.

Compute Relevance of Search Results

The relevance of search content with respect to a particular search query is dependent on how well each entity is recognized in the search query and the available content, as well as how well the search query and search content matches, as noted above. Therefore one or more relevance values may be computed as a function of the three factors described above: Quality of Recognition of Search Query, Quality of Recognition of Search Content and Quality of Match between Search Query & Search Content for each entity. The three factors can be formed as a "combination" as in a simple addition, multiplication, weighted calculation or some other formula, any which may be employed in accordance with various embodiments of the invention.

In use, whenever displaying a set of search results, order of display is important as display of the most relevant search results first provides a better ability for the searcher to retrieve desired information. In accordance with various embodiments of the present invention, rather than presenting the search results in accordance with a more traditional search result ordering according to keyword matching or popularity, the results may be sorted in an appropriate order to show results by relevance, by knowledge entities, by clusters of knowledge entities, as determined above. Thus, search results including the highest computer score according to the system and method described above may be presented first.

Popularity of Content

In accordance with one or more embodiments of the present invention, there are at least two instances when popularity of content may be useful in ordering search results, in addition to application of the ordering system described above in accordance with various embodiments of the invention. First, when there is no knowledge base or when there are no knowledge based recognitions of search query or search content, the only possible search may be similar to a standard keyword search. Like a keyword search, the present invention can order search results by popularity of content. In the absence of any knowledge base or search query recognitions, quality of search may be driven by popularity metrics. This can be achieved by including an index of keywords in the knowledge base. Search Query tokens can be resolved into a namesake/placeholder knowledge entity such as "Search-Keyword-Entity" via this Keyword Index.

In a second situation, when a particular query search result ranking in accordance with the embodiments of the invention noted above produces multiple search results from multiple content sources that are of similar relevance, popularity of the content may be used to further differentiate between the determined the search results. Popularity of content may be factored in only within similar relevance value groups to further differentiate search results.

In the above two situations, or if keyword matches are to be utilized in addition to the knowledge based search results described in accordance with the present invention, it is preferable that keyword matches not unduly influence relevance values or worse—change the knowledge based relevance values into popularity rating values. The following techniques may preferably be employed to ensure that this doesn't happen.

If the goal is to deliver knowledge based relevant search results then keyword entity matches should be considered less relevant compared to knowledge entity matches. To achieve this goal, when computing a relevance value of keyword entities, a very high decrement or discount may preferably applied, thus resulting in any keyword results having only a minimal impact on the overall ranking. Thus, when some keywords are recognized in addition to some knowledge entities then the total relevance value will be slightly higher than if just the knowledge entities were recognized. When only keywords are recognized then the relevance values will be an order of magnitude smaller than when some knowledge entities are also recognized thereby making keyword only matched content preferably significantly less relevant than that of knowledge base matched content.

Alternative Embodiments of the Invention

The above description describes the process of computing a quality of search for a simple case wherein a search query and/or content is recognized using a single knowledge base assuming no ambiguity in recognition as shown below:

Search Query→Knowledge Base→Reduced Form

The various embodiments of the present invention may be applied to many other variations/use cases as follows:

a. The case of multiple knowledge bases resulting in multiple reduced forms for a given search query.

Search Query→Knowledge Base (1 to M)→Reduced Form (up to M)

b. The case of ambiguity within a knowledge base resulting in multiple possibilities of search query recognition which later results in multiple reduced forms for a given search query.

Search Query→Knowledge Base→Multiple Possibilities of Recognition (1 to N)→Reduced Form (up to N)

c. The case when some search query tokens are not recognized in the particular knowledge base. In this case, unrecognized tokens may act as keyword entities and if result contains these keywords also in addition to Knowledge Entities then it adds some more weight to the result, in a manner as noted above.

d. The case of no knowledge base or no search query tokens recognized as knowledge entities within the knowledge base. This case will produce keyword matched similar results and the relevance values may be driven by popularity values alone, as noted above.

e. The case of applying popularity metrics instead of or in addition to knowledge base, as described above.

f. The case of applying popularity of knowledge base as the knowledge base.

g. Content can be structured or unstructured.

h. The case of multiple knowledge bases representing a content source.

i. The case of one knowledge base representing multiple comparable content sources.

Knowledge bases for each Dataset Collections 1 . . . p→Dataset Collections 1 . . . q→Comparable Datasets 1 . . . r To illustrate one particular example of an embodiment of the present invention for determining a set of best responses to a user query from among a group of content documents, a quality of search or relevance values that may be determined in accordance with one or more embodiments of the invention, consider a knowledge base that contains "Amazon Incorporated" as an instance of the knowledge entity or concept called Company and Innovation as a keyword in the Keyword Index. Assume that weights for each known word or entity that is matched varies between 0 and 1, 1 indicating a best match. When confidence in entity recognition is lower, perhaps because only partial information is available, synonyms are used, or for any other reason, its weight is preferably reduce from 1 to some fraction of 1. A weight of 0 is indicative of an unmatched word, and further indicates that the word should be treated as part of a keyword search and should add a very little value may be 0.01 to overall match weight. The reason behind keyword match score being so low is that it matches purely based on string match, and fails to employ the benefits of semantic match set forth in accordance with the various embodiments of the invention. These weights are suggested for example only, as different absolute or relative values may be employed, in accordance with the desired application.

Consider the content includes following pages with this content and popularity in parentheses, such popularity measurements being used only when meaning based rankings are not sufficiently differentiated:

a. Page 1: Amazon Incorporated Innovation (100)
b. Page 2: Amazon Innovation (1,000)
c. Page 3: Amazon (10,000)
d. Page 4: Innovation (1,000,000)
e. Page 5: Apple Innovation (10,000,000)

The determination of the quality of search content recognitions for each entity with respect to the above mentioned knowledge base may be as follows:

a. Page 1: "Amazon Incorporated" is recognized as a knowledge entity in the knowledge base, leading to a quality of recognition value of 1. "Innovation" is also recognized as keyword entity with quality of recognition of 1.

Similarly quality of recognition scores for each entity may be
  b. Page 2: Amazon Innovation has scores of 0.9,1 ("Amazon" is slightly different than "Amazon Incorporated", and therefore has a decrement to 0.9.)
  c. Page 3: Amazon alone has a score of 0.9
  d. Page 4: Innovation alone has a score of 1
  e. Page 5: Apple Innovation together have scores of 0,1 ("Apple" is not part of the knowledge base, and therefore has a recognition value of "0".)

The following tables illustrate the process, starting with the above recognition values, and resulting in the content rankings for responding to the user query. As is shown in Table 9, a quality of match matrix for each entity of the search query is provided. On the vertical column axis, each of the search content pages is noted, with a popularity of each being also provided. The horizontal row axis depicts a quality of recognition of search content, as described above. Thus, each term in the search query is provided an index, here shown above the matrix table in each column. Values within the matrix therefore represents the quality of match between the search query and the search content, implementing the rules noted above with respect to Table 8. Table 10 then calculates relevance values as the sum of the Quality of Recognition of Search Query, Quality of Recognition of Search Content, and Quality of match, on a manner as noted above. In Table 11, the search content pages are ordered based upon the calculated relevance values, without popularity being taken into account. Finally in Table 12, popularity is employed to further differentiate and order content pages with similar relevance values.

TABLE 11

Order of Search Content Pages w/o Popularity

| Results Pages Order | 1, 2, 3 | 1, 2, 3 | 1, 2, 3, 4, 5 | 1, 2, 4, 5 |
|---|---|---|---|---|

TABLE 12

Order of Search Content Pages with Popularity used within similar Relevance groups

| Results Pages Order | G1(1), G2(2, 3) | G1(1), G2(2, 3) | G1(1), G2(3, 2), G3(5, 4) | G1(5, 4, 2, 1) |
|---|---|---|---|---|

Embodiments of the present invention may be employed on various appropriate computer systems, providing sufficient computing power and storage means. Access to such computing system may be provided to one or more users in any manner, such as via a web portal, direct connection, or other access.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

TABLE 9

Quality of Match Matrix for Each Entity of Search Query / Quality of Recognition of Search Query -->

| Page # | Search Content Pages | Popularity | Quality of Recognition of Search Content | Query 1 Amazon Incorporated 1, | Query 2 Amazon 0.9, | Query 3 Amazon Innovation 0.9, 1 | Query 4 Innovation 1.000 |
|---|---|---|---|---|---|---|---|
| 1 | Amazon Incorporated Innovation | 100 | 1, 1 | 1 | 1 | 1, 1 | 1 |
| 2 | Amazon Innovation | 1000 | 0.9, 1 | 1 | 1 | 1, 1 | 1 |
| 3 | Amazon | 10,000 | 0.9, | 1 | 1 | 1, 0 | 0 |
| 4 | Innovation | 1,000,000 | 1, | 0 | 0 | 0, 1 | 1 |
| 5 | Apple Innovation | 10,000,000 | —, 1 | 0 | 0 | 0, 1 | 1 |

TABLE 10

Relevance Values = Sum of (Qual of Recognition of Search Query * Qual of Recognition of Search Content * Qual of Match) for each Entity In Search Query

| Results Pages Page # | Relevance Values Query 1 | Query 2 | Query 3 | Query 4 |
|---|---|---|---|---|
| 1 | 1 | 1.000 | 0.9100 | 0.010 |
| 2 | 0.900 | 0.810 | 0.8200 | 0.010 |
| 3 | 0.900 | 0.810 | 0.810 | 0 |
| 4 | 0 | 0 | 0.010 | 0.010 |
| 5 | 0 | 0 | 0.010 | 0.010 |

Note:
Relevance of keyword entity is lower than Knowledge Entity there decremented by a factor of 100(an assumption)

What is claimed is:

1. A method for determining an absolute confidence of match between content and a search query, comprising the steps of:
   determining a quality of recognition of a search query in accordance with a knowledge base by determining whether each element of the search query comprises is directly matched to an element of the knowledgebase or is indirectly resolved to one or more elements of the knowledgebase via one or more knowledge indices based upon one or more determined variations of each element of the search query, and decrementing the quality of recognition in accordance with each indirectly resolved element of the search query;
   wherein the step of determining the quality of recognition of the search query further comprises the steps of determining a quality of recognition of one or more entities in the search query in accordance with the knowledge base by identifying one or more search tokens associated with the search query; assigning all search query tokens an expected weight corresponding to complete recognition; determining for each search query token, a knowledge base entity corresponding thereto; decrementing the expected weight associated with a particular search token when it is determined that the particular search token is indirectly resolved, in accordance with one or more knowledge base components, to the corresponding knowledge base entity; combining the weights for all search query tokens that are associated with a single knowledge entity corresponding to the knowledge base; and determining a quality of associations between the one or more entities in the search query in accordance with the knowledge base;

determining a quality of recognition of search content in accordance with a knowledge base by determining whether each element of the search content comprises is directly matched to an element of the knowledgebase or is indirectly resolved to one or more elements of the knowledgebase via one or more knowledge indices based upon one or more determined variations of each element of the search content, and decrementing the quality of recognition in accordance with each indirectly resolved element of the search content;

determining a quality of match between one or more knowledge base representations of the search query and one or more knowledge base representations of the search content; and computing an absolute composite measure of the degree of match between search query and search content in accordance with the quality of recognition of the search query, quality of recognition of the search content, and the quality of match.

2. The method of claim 1, further comprising the step of resetting the expected weight of one or more search tokens unrecognized in the knowledge base to zero.

3. The method of claim 1, wherein the expected weight of one or more search tokens that are directly resolved remain at the initial expected weight corresponding to complete recognition.

4. The method of claim 1, wherein the expected weight corresponding to complete recognition is 1.

5. The method of claim 1, wherein the expected weight corresponding to complete recognition is defined by a user.

6. The method of claim 1, wherein a level of decrementing of the expected weight associated with a particular search token is determined in accordance with a type of one or more knowledge base components used to resolve the search token and the corresponding knowledge base entity.

7. The method of claim 1, further comprising the step of combining the weights for each of a plurality of single knowledge entities corresponding to the knowledge base to form an overall weight of entity recognition.

8. The method of claim 1, wherein the step of determining a quality of recognition of one or more associations in the search query further comprises the steps of:

identifying one or more associations between each of the plurality of single knowledge entities corresponding to the knowledge base; and decrementing the expected weight associated with each of the plurality of single knowledge entities corresponding to a particular association when it is determined that the association is not directly resolved.

9. The method of claim 8, wherein a level of decrementing of the expected weight associated with each of the plurality of single knowledge entities corresponding to a particular association is determined in accordance with a distance of indirection of the association.

10. The method of claim 1, wherein the step of determining a quality of recognition of a search query further comprises the steps of:

determining a quality of recognition of one or more entities in the search content in accordance with the knowledge base; and determining a quality of associations between the one or more entities in the search content in accordance with the knowledge base.

11. The method of claim 10, wherein the step of determining a quality of recognition of one or more entities in the search content further comprises the steps of:

identifying one or more content elements in the search content;

assigning all content elements an expected weight corresponding to complete recognition;

determining for each content element, a knowledge base entity corresponding thereto;

decrementing the expected weight associated with a particular content element when it is determined that the particular content element is indirectly resolved, in accordance with one or more knowledge base components, to the corresponding knowledge base entity; and combining the weights for all content elements that are associated with a single knowledge entity corresponding to the knowledge base.

12. The method of claim 11, further comprising the step of resetting the expected weight of one or more content elements unrecognized in the knowledge base to zero.

13. The method of claim 11, wherein the expected weight of one or more content elements that are directly resolved remain at the initial expected weight corresponding to complete recognition.

14. The method of claim 11, wherein the expected weight corresponding to complete recognition is 1.

15. The method of claim 11, wherein the expected weight corresponding to complete recognition is defined by a user.

16. The method of claim 11, wherein a level of decrementing of the expected weight associated with a particular content element is determined in accordance with a type of one or more knowledge base components used to resolve the content and the corresponding knowledge base entity.

17. The method of claim 11, further comprising the step of combining the weights for each of a plurality of single knowledge entities corresponding to the knowledge base to form an overall weight of entity recognition.

18. The method of claim 11, wherein the step of determining a quality of recognition of one or more associations in the search content further comprises the steps of:

identifying one or more associations between each of the plurality of single knowledge entities corresponding to the knowledge base; and decrementing the expected weight associated with each of the plurality of single knowledge entities corresponding to a particular association when it is determined that the association is not directly resolved.

19. The method of claim 18, wherein a level of decrementing of the expected weight associated with each of the plurality of single knowledge entities corresponding to a particular association is determined in accordance with a distance of indirection of the association.

20. The method of claim 1, wherein the step of determining a quality of match between one or more knowledge base representations of the search query and one or more knowledge base representations of the search content further comprises the steps of:

assigning all match values between one or more knowledge base representations of the search query and one or more knowledge base representations of the search content an expected weight corresponding to an exact match;

determining correspondence of match between each knowledge base representation of the search query and each knowledge base representation of the search content;

decrementing the expected weight associated with each of the match values when it is determined that the match is not an exact match.

21. The method of claim 20, wherein the decrement to the expected weight is a first value when the one or more knowledge base representations of the search content includes one or more additional entities as compared with the knowledge base representations of the search query.

22. The method of claim 21, wherein the decrement to the expected weight is a second value greater than the first value when the one or more knowledge base representations of the search query includes one or more additional entities as compared with the knowledge base representations of the search content.

23. A non-transitory computer readable storage medium having a computer program stored thereon, the computer program determining an absolute confidence of match between content and a search query, the computer program causing a general purpose computer system to perform the steps of:

determining a quality of recognition of a search query in accordance with a knowledge base by determining whether each element of the search query comprises is directly matched to an element of the knowledgebase or is indirectly resolved to one or more elements of the knowledgebase via one or more knowledge indices based upon one or more determined variations of each element of the search query, and decrementing the quality of recognition in accordance with each indirectly resolved element of the search query;

wherein the step of determining the quality of recognition of the search query further comprises the steps of determining a quality of recognition of one or more entities in the search query in accordance with the knowledge base by identifying one or more search tokens associated with the search query; assigning all search query tokens an expected weight corresponding to complete recognition; determining for each search query token, a knowledge base entity corresponding thereto; decrementing the expected weight associated with a particular search token when it is determined that the particular search token is indirectly resolved, in accordance with one or more knowledge base components, to the corresponding knowledge base entity; combining the weights for all search query tokens that are associated with a single knowledge entity corresponding to the knowledge base; and determining a quality of associations between the one or more entities in the search query in accordance with the knowledge base;

determining a quality of recognition of search content in accordance with a knowledge base by determining whether each element of the search content comprises is directly matched to an element of the knowledgebase or is indirectly resolved to one or more elements of the knowledgebase via one or more knowledge indices based upon one or more determined variations of each element of the search content, and decrementing the quality of recognition in accordance with each indirectly resolved element of the search content;

determining a quality of match between one or more knowledge base representations of the search query and one or more knowledge base representations of the search content; and computing an absolute composite measure of the degree of match between search query and search content in accordance with the quality of recognition of the search query, quality of recognition of the search content, and the quality of match.

24. A system for determining of an absolute confidence of match between content and a search query, comprising:

a processor, the processor performing the steps of determining a quality of recognition of a search query in accordance with a knowledge base by determining whether each element of the search query comprises is directly matched to an element of the knowledgebase or is indirectly resolved to one or more elements of the knowledgebase via one or more knowledge indices based upon one or more determined variations of each element of the search query, and decrementing the quality of recognition in accordance with each indirectly resolved element of the search query, wherein the step of determining the quality of recognition of the search query further comprises the steps of determining a quality of recognition of one or more entities in the search query in accordance with the knowledge base by identifying one or more search tokens associated with the search query; assigning all search query tokens an expected weight corresponding to complete recognition; determining for each search query token, a knowledge base entity corresponding thereto; decrementing the expected weight associated with a particular search token when it is determined that the particular search token is indirectly resolved, in accordance with one or more knowledge base components, to the corresponding knowledge base entity; combining the weights for all search query tokens that are associated with a single knowledge entity corresponding to the knowledge base; and determining a quality of associations between the one or more entities in the search query in accordance with the knowledge base;

determining a quality of recognition of search content in accordance with a knowledge base by determining whether each element of the search content comprises is directly matched to an element of the knowledgebase or is indirectly resolved to one or more elements of the knowledgebase via one or more knowledge indices based upon one or more determined variations of each element of the search content, and decrementing the quality of recognition in accordance with each indirectly resolved element of the search content, determining a quality of match between one or more knowledge base representations of the search query and one or more knowledge base representations of the search content, and computing an absolute composite measure of the degree of match between search query and search content in accordance with the quality of recognition of the search query, quality of recognition of the search content, and the quality of match.

25. The system of claim 24, wherein the processor is located at a location to a location for inputting the query.

* * * * *